US008780167B2

(12) United States Patent
Daddi

(10) Patent No.: US 8,780,167 B2
(45) Date of Patent: Jul. 15, 2014

(54) SYSTEMS AND METHODS FOR VIRTUAL PRESENCE VIDEOCONFERENCING

(75) Inventor: Mark Daddi, Moon Township, PA (US)

(73) Assignee: Bayer Business and Technology Services, LLC, Pittsburgh, PA (US)

(*) Notice: Subject to any disclaimer, the term of this patent is extended or adjusted under 35 U.S.C. 154(b) by 417 days.

(21) Appl. No.: 13/176,040

(22) Filed: Jul. 5, 2011

(65) Prior Publication Data

US 2013/0010053 A1    Jan. 10, 2013

(51) Int. Cl.
*H04N 7/14* (2006.01)

(52) U.S. Cl.
USPC ..................... 348/14.08; 348/14.04

(58) Field of Classification Search
USPC ............... 379/93.21, 158, 202.01; 348/14.01, 348/14.04, 14.08
See application file for complete search history.

(56) References Cited

U.S. PATENT DOCUMENTS

| 4,826,245 | A | * | 5/1989 | Entratter | 297/217.5 |
|---|---|---|---|---|---|
| 6,102,476 | A | * | 8/2000 | May et al. | 297/217.3 |
| 6,215,518 | B1 | * | 4/2001 | Watkins | 348/148 |
| 6,292,305 | B1 | | 9/2001 | Sakuma et al. | |
| 7,057,637 | B2 | | 6/2006 | White | |
| 7,106,358 | B2 | | 9/2006 | Valliath et al. | |
| 7,760,229 | B2 | | 7/2010 | White | |
| 8,300,785 | B2 | * | 10/2012 | White | 379/93.21 |
| 8,407,944 | B2 | * | 4/2013 | Baloga et al. | 52/36.1 |
| 2002/0117881 | A1 | * | 8/2002 | Benja-Athon | 297/217.1 |
| 2007/0171275 | A1 | | 7/2007 | Kenoyer | |
| 2008/0100106 | A1 | * | 5/2008 | Dragusin | 297/217.3 |
| 2009/0152915 | A1 | * | 6/2009 | Krasna et al. | 297/217.3 |
| 2010/0225732 | A1 | | 9/2010 | De Beer et al. | |
| 2010/0225735 | A1 | | 9/2010 | Shaffer et al. | |
| 2010/0238265 | A1 | | 9/2010 | White | |
| 2010/0253761 | A1 | | 10/2010 | White | |

* cited by examiner

*Primary Examiner* — Olisa Anwah
(74) *Attorney, Agent, or Firm* — Donald R. Palladino

(57) ABSTRACT

Systems and methods are disclosed for virtual presence communication systems that provide both local and remote participants in a conference with a more realistic and engaging conferencing experience. A virtual presence communication system comprises a projection screen, an image-generating unit, at least one communication port, and a video camera, where each is configured to couple to a chair having a seat and a seatback portion. The virtual presence communication system may be integrated with the chair, which can be positioned proximate to a conference table, desk, podium, or other suitable location. The projection screen may be positioned in an angled relationship with a video screen or other image-generating device. The video screen may provide an image of the remote participant that is reflected by the projection screen. The chair also may include a video camera that is configured to generate a video feed that is supplied to the remote participant. The chair may be generally portable to allow the chair to moved (e.g., rolled) to different locations.

20 Claims, 8 Drawing Sheets

SYSTEMS AND METHODS FOR VIRTUAL PRESENCE VIDEOCONFERENCING

BACKGROUND OF THE INVENTION

Generally, videoconferencing may be used to allow two or more participants at remote locations to communicate using both video and audio. Each participant location may include a videoconferencing system for video/audio communication with the other participants. Videoconferencing systems may include a camera and microphone to collect video and audio from a first or local participant to send to another (remote) participant. Each videoconferencing system also may include a display and speaker to reproduce video and audio received from a remote participant.

Many videoconferencing configurations employ a video monitor (e.g., television, computer screen, etc.) to supply an image of the remote participant. In a conference room setting, the video monitor is often mounted on a wall, positioned on a rack, or otherwise positioned in a location that is physically separated from the local participants seated at the conference table. The camera associated with the video monitor that supplies video to the remote participant is typically positioned in close proximity to the video monitor. Thus, if the video monitor is mounted on the wall, the video feed sent to the remote user is also from the perspective of the wall.

SUMMARY OF THE INVENTION

In one general aspect, the present disclosure is directed to a virtual presence communication system to enable a local participant to communicate with a remote participant. The system may comprise a chair having a seatback, a seat, and a projection screen coupled to the chair. The projection screen may be positioned for viewing by a local participant. The system also may comprise an image-generating unit coupled to the chair, with the image-generating unit configured to display an image of the remote participant, where the image-generating unit is positioned in an angled relationship to the projection screen. The system also may comprise at least one-communication port coupled to the chair, where the communication port is configured to receive a video signal for display by the image-generating unit. The system also may comprise a video camera.

In another general aspect, the present disclosure is directed to a virtual presence chair. The virtual presence chair may comprise a seatback, a seat, a projection-screen positioned proximate the seatback, a video monitor positioned proximate the seat, a video camera, a speaker, and a microphone.

In yet another general aspect, the present disclosure is directed to a method for virtual presence conferencing. The method may comprise receiving a video image of a remote participant in a conference, displaying the video image on a video monitor coupled to a chair, and reflecting the video image by a projection screen towards a local participant. The method also may comprise receiving audio from the remote participant in the conference, projecting the audio using an audio speaker coupled to the chair, capturing a video image of the local participant using a video camera coupled to the chair, and capturing audio of the local participant using a microphone coupled to the chair.

It is understood that the various embodiments of the invention disclosed and described in this specification are not limited to the embodiments summarized in this Summary.

BRIEF DESCRIPTION OF THE DRAWINGS

The present disclosure will be more readily understood from a detailed description of some example embodiments taken in conjunction with the following figures.

DESCRIPTION OF THE INVENTION

Figure 1:
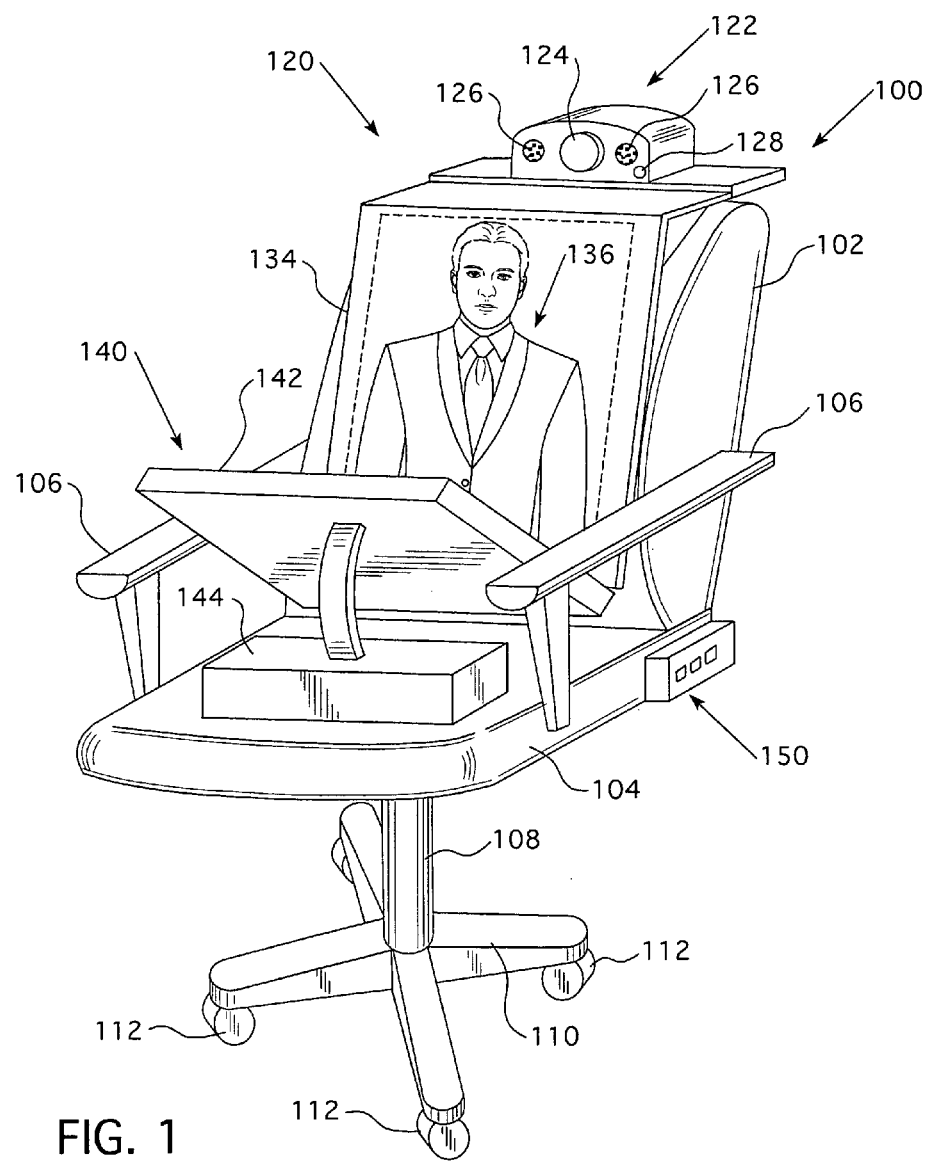
FIG. 1 is a perspective view of a virtual presence chair in accordance with one non-limiting embodiment.

Various non-limiting embodiments of the present disclosure will now be described to provide an overall understanding of the principles of the structure, function, and use of the virtual presence communication systems and processes disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The presently disclosed example embodiments are generally directed to systems and methods for virtual presence communication that provide both local and remote participants in a conference with a more realistic and engaging conferencing, experience. In one embodiment, a virtual presence videoconferencing system is integrated with, or otherwise coupled to, a chair that can be positioned proximate to a conference table, desk, podium, or other suitable location. In one embodiment, the chair may include a projection screen that is positioned in an angled relationship with a video screen or other image-generating device that is coupled to the chair. The video screen may provide an image of the remote participant that is reflected by the projection screen toward a local participant. The chair also may include a video camera that is configured to generate a video feed that is supplied to the remote participant. The chair may be generally portable to allow the chair to be moved (e.g., rolled) to different locations, such as within a room or within a building.

During a videoconference using the virtual presence videoconferencing systems described herein, both the local participants (e.g., the person or persons in the physical conference room) and the remote participant (e.g., the person located in a separate location whose image is provided by the virtual presence chair) may experience a conferencing experience that strives to emulate face-to-face contact. The chair may be positioned at a location such as a conference table, desk, podium, and the like and provides a real-time or near-real-time audio and video audio and video of the remote participant to the local participants. Thus, instead of viewing the remote participant on a wall-mounted or rack-mounted monitor, the local participants may view the remote participant in a chair that is positioned proximate the table. The chair may include a video camera to generate a video feed and one or more microphones to generate an audio feed for transmission to the remote participant. With the video camera mounted to the chair, the video feed received by the remote participant will be from the vantage point of the chair in the physical conference room. By providing this vantage point to the remote participant (as opposed to a vantage point from a wall, for example), the remote user may feel more connected to the local participants and increase the user experience for all participants. In certain embodiments when multiple microphones are associated with the chair, the remote user also may receive an audio feed with a directional component.

FIG. 1 is a perspective view of a virtual presence chair 100 in accordance with one non-limiting embodiment. The virtual presence chair 100 may comprise a seatback 102, a seat 104, and arm rests 106. The virtual presence chair 100 also may include a spindle 108, castor support frame 110, and a plurality of castors 112. It is noted that the virtual, presence chair 100 is not limited to any particular configuration or construction shown herein. Rather, it is to be appreciated that the virtual presence chair 100 may be produced in a variety of different configurations. For example, in one embodiment, the virtual presence chair 100 is constructed to look similar to other chairs in a conference room. Thus, if a particular conference room has particular distinctive conference chairs, the virtual presence chair 100 also may share some or all of the same design elements.

The virtual presence chair 100 may also comprise a video projection system 120. The video projection system 120 may be integrated into, or otherwise coupled to, the virtual presence chair 100. In one embodiment, the video projection system 120 may comprise an audio/visual (A/V) unit 122. The A/V unit, 122 may be positioned atop the seatback 102, although this disclosure is not so limited. The A/V unit 122 may comprise a video camera 124, one or more speakers 126, and one or more microphones, 128. The video camera 124 and the microphone 128 supplies video and audio, respectively, to the remote participant. The speakers 126 supply audio from the remote participant to the local participants. The video camera 124 may be any suitable type of camera, such as a high definition camera, for example.

The video projection system 120 may comprise a projection screen 134 that is positioned proximate the seatback 102. The projection screen 134 may be positioned generally parallel to the seatback 102 (as illustrated) or it may be positioned in an angled relationship, as described in more detail below. The projection screen 134 may be a generally transparent screen capable of reflecting an image 136 of a remote participant to local participants. The projection screen 134 may be any suitable size, shape, or configuration, such as curved, hinged, circular, square, rectangular, tapered, or asymmetric, for example. The projection screen 134 may be made of any suitable material, such as glass, plastic, or other composite material. The projection screen 134 may be rigid or flexible (e.g., a thin film stretched across a rigid frame). The projection screen 134 may be permanently or removeably coupled to the virtual presence chair 100 using any suitable technique, such as using brackets, adhesives, snap buttons, hook-and-loop fasteners known under the tradename VELCRO, and/or other fasteners.

The video projection system 120 may comprise an image-generating unit 140 that is positioned proximate the projection screen 134. Generally, an image displayed on or by the image-generating unit 140 may be reflected by the projection screen 134 toward a local participant. The image-generating unit 140 may be mounted in an angled relationship to the projection screen 134. In one embodiment, the image-generating unit 140 comprises a video screen 142 and a base 144.

The base 144 may sit on or be attached to the seat 104. The video screen 142 may be, without limitation, a LCD video display, a plasma video display, a cathode ray tube display, or any other device capable of receiving a video signal and displaying an image. The image-generating unit 140 may be permanently or removeably coupled to the virtual presence chair 100 using any suitable technique, such as using brackets, adhesives, snap buttons, hook-and-loop fasteners known under the tradename VELCRO, and/or other fasteners.

The virtual presence chair 100 also may include one or more communication ports 150. The communication ports 150 may communicate data, video, audio, power, and the like. For example, the communication ports 150 may include a power port used to supply power to the A/V unit 122 and the image-generating unit 140. The communication ports 150 may also supply an audio signal to the speakers 126.

Figure 2:
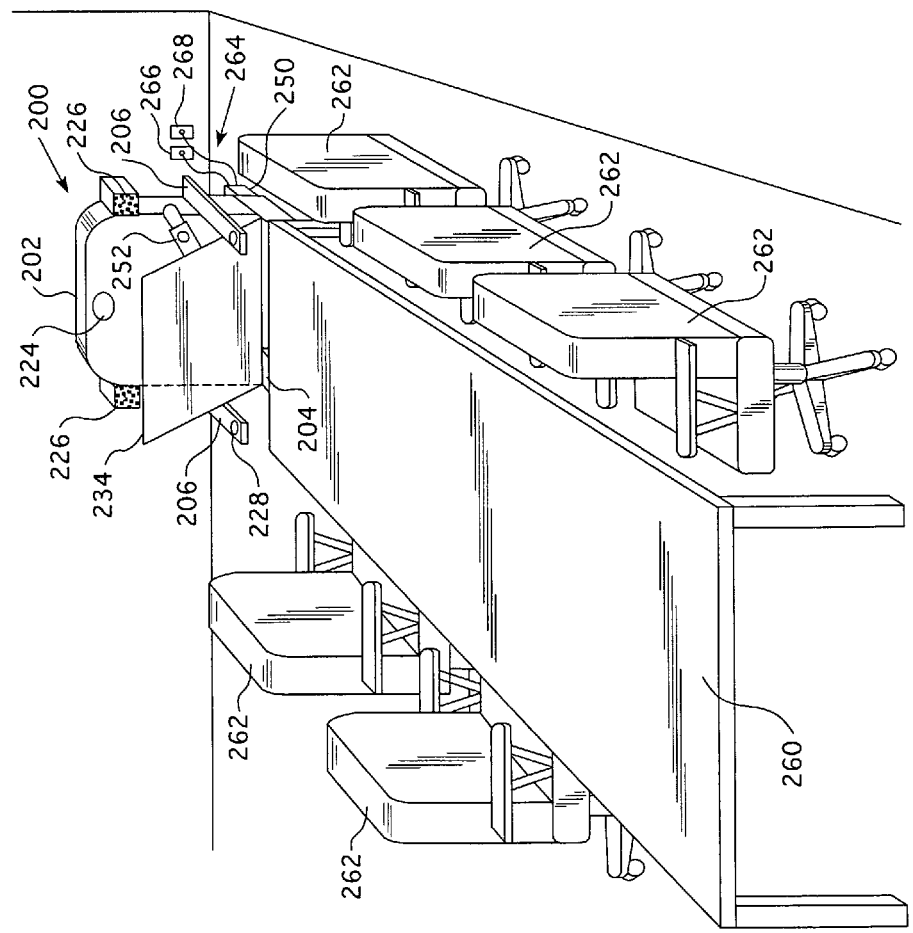
FIG. 2 shows a virtual presence chair in a conference room environment in accordance with one non-limiting embodiment.

Referring now to FIGS. 2-7, unless otherwise indicated, the components with corresponding reference, numerals (e.g., 124, 224, 324) can have the same or a similar structure and function as discussed above with respect to other embodiments. As such, these components will not be discussed in detail again for the sake of brevity. FIG. 2 shows a virtual presence chair 200 in a conference room environment in accordance with one non-limiting embodiment. The virtual presence chair 200 is positioned proximate to the conference table 260. As is to be appreciated, one or more local participants may sit in the other conference chairs 262 positioned around the table. Additionally, the virtual presence chair 200 may be positioned at any position around the table. During a conference, an image of a remote participant may be projected onto the projection screen 234 to give the appearance or sensation that the remote participant is sitting in the virtual presence chair 200.

As illustrated, the projection screen 234 may be mounted in an angular relationship with the seatback 202. The relative angle of projection screen 234 may be adjustable via an adjustment arm 252. This adjustment may be made manually or automatically (e.g., via motorized control). Due to different lighting environments and seating configurations; adjusting the relative angle of the projection screen 234 may allow for better visibility of the image by the local participants. The projection screen 234 may be at least partially transparent to allow the local participants to see the seatback 202 through the projection screen 234, such as in areas where the image is not displayed. An image-generating unit (not shown) may be positioned on the seat 204 of the virtual presence chair 200 to generate an image that is reflected by the projection screen 234. In the illustrated embodiment, a video camera 224 is integrated into the seatback 202 and speakers 226 flank either side of the seatback 202, although this disclosure is not so limited. In some embodiments, the speakers 226 may be concealed or hidden from view. Microphones 228 may be positioned at various positions on the chair 260, such as on the arm rests 206. In the illustrated embodiment, cabling 264 attaches to the communication ports 250. The cabling 264 may include, for example, data cables (e.g., audio/video) and power cables. The cable 264 may connect, for example, to a power outlet 266 and a data port (e.g., RJ-45) 268.

The virtual presence chair 200 may be moveable (e.g., portable) such that it can be moved to any position at the conference cable 260. The virtual presence chair 200 also could be moved completely into a different conference room or environment. The virtual presence chair 200 may be largely self-contained allowing for portability. In some embodiments, the virtual presence chair 200 may be moved between a number of different environments (e.g., a plurality of conference rooms) without needing to specially adapt the environment to accommodate the chair. Rather, the virtual presence chair 200 may be positioned as needed. For example, the virtual presence chair 200 can be moved between a relatively small conference room, a large conference room, and into an office for a one-on-one meeting with relative-ease. In each instance, only the proper communication connections (wired and/or wireless) and power connections would need to be made to allow for a virtual presence communication environment between one or more local participants and a remote participant. In some embodiments, the virtual presence chair 200 may operate via locally supplied power (e.g., a battery pack).

Figure 3:
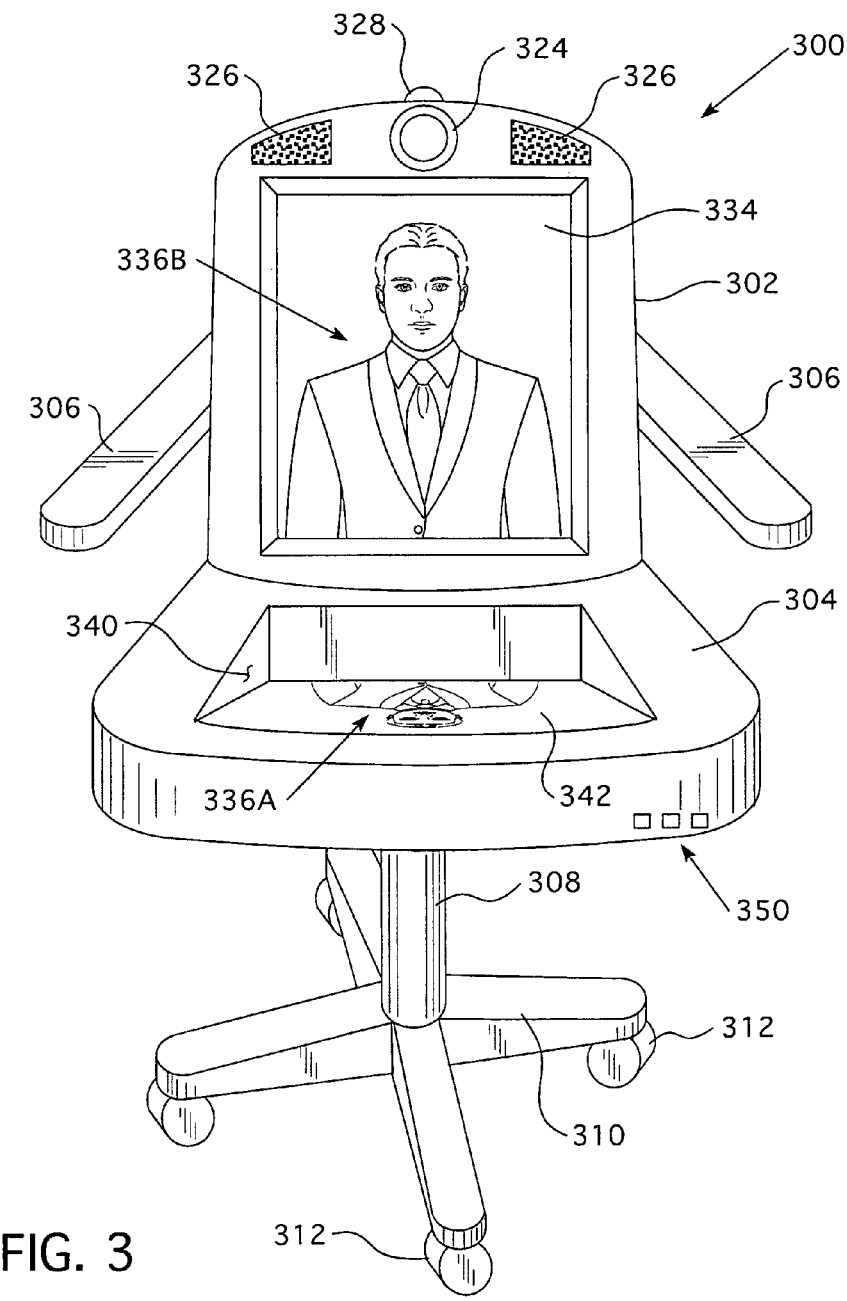
FIG. 3 is a front view of a virtual presence chair in accordance with one non-limiting embodiment.

FIG. 3 is a front view of a virtual presence chair 300 in accordance with one non-limiting embodiment. In this illustrated embodiment, the video screen 342 is angularly recessed into the seat 304 and the projection screen 334 is vertically positioned in the seatback 302. A video image 336A may be displayed on the video screen 342 such that a reflected image 336B is reflected by the projection screen 334. The video signal for the video image 336A may be received via at least one communication port 350. Since the video screen 342 and the projection screen 334 are recessed, or at least flush mounted, the virtual presence chair 300 generally maintains the same form as a standard office-type chair. In some embodiments, the video screen 342 may be partially recessed into the seat, such that a first portion of the video screen 342 extends beneath a top surface plane of the seat 304 and a second portion of the video screen extends above the top surface plane of the seat 304.

Figure 4:
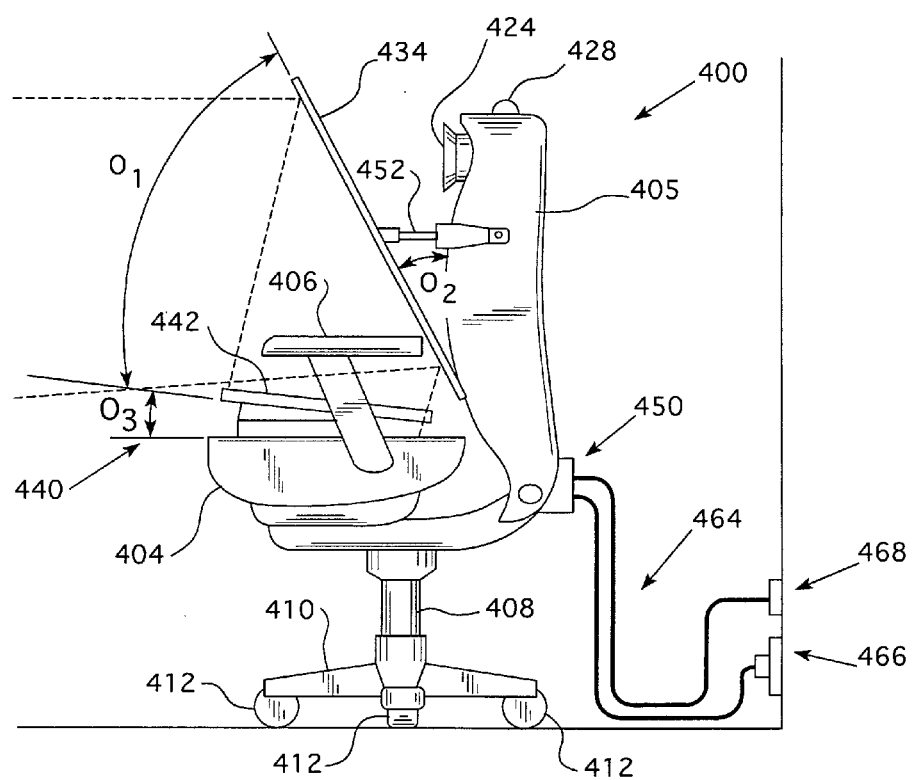
FIG. 4 is a side view of a virtual presence chair in accordance with one non-limiting embodiment.

FIG. 4 is a side view of a virtual presence chair 400 in accordance with one non-limiting embodiment. In this illustrated embodiment, the video camera 424 is positioned on the seatback 402 at a position that is lower than the top of the projection screen 434. As indicated by the dashed lines in FIG. 4, the image from the video screen 442 is reflected by the projection screen 434 outward from the virtual presence chair 400. The projection screen 434 is positioned in an angular relationship relative to the video screen 442 (angle $\theta_1$). The angle $\theta_1$ may be adjusted by adjusting at least one of the projection screen 434 and the video screen 442. For example, $\theta_2$, which is the angle of the projection screen relative to a vertical plane, may be adjusted via the adjustment arm 452. The angle of the video screen 442, relative to a horizontal plane, shown as $\theta_3$, may also be adjusted. By adjusting one or more of the projection screen 434 and the video screen 442 the placement of the reflected image on the projection screen 434 may be manipulated for the benefit of the local participants observing the reflected image.

Figure 5:
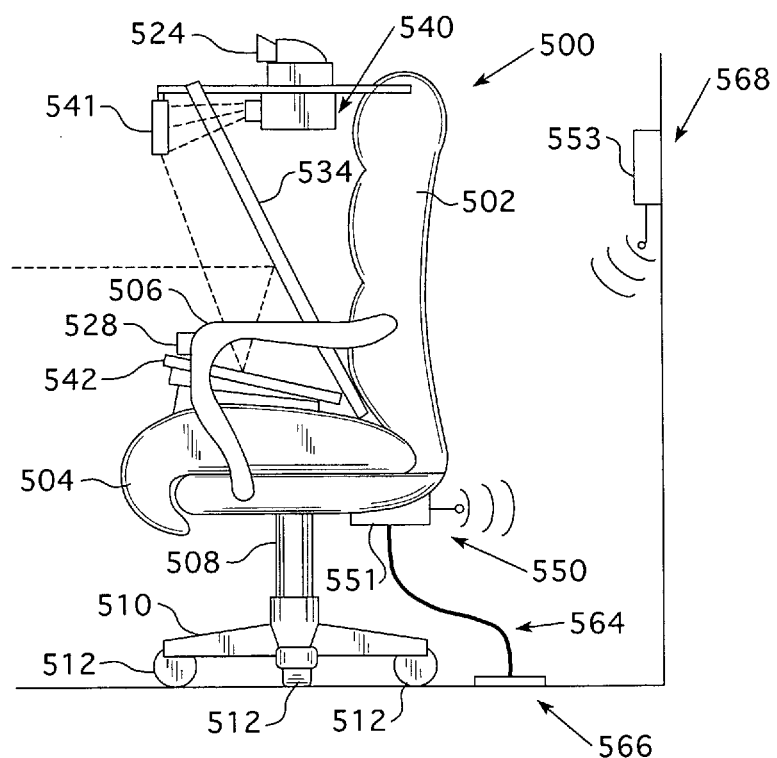
FIG. 5 is a side view of a virtual presence chair in accordance with one non-limiting embodiment.

FIG. 5 is a side view of a virtual presence chair 500 in accordance with one non-limiting embodiment. In this illustrated embodiment, the virtual presence chair 500 uses wireless communication to send and receive data, such as, for example, audio and visual data. A first wireless transceiver 551 may be coupled to the virtual presence chair 500 and a second wireless transceiver 553 may be positioned remote from the chair. In some embodiments, the virtual presence chair 500 may be locally powered (e.g., via a battery pack) to allow for complete portability. In the embodiment illustrated in FIG. 5, the image-generating unit 540 comprises a video projector that reflects an image off of a mirror 541 towards seat pan 542 and towards the projection screen 534. As indicated by the dashed lines in FIG. 5, the image from the image-generating unit 540 is ultimately reflected outward from the virtual presence chair 500. As is to be appreciated, additional configurations incorporating a video projector may be used without departing from the scope of the present disclosure. For example, the video projector may be mounted beneath the seat with the image reflected towards the projection screen 534 using a series of reflective surfaces, such as one or more white surfaces and/or mirrors.

Figure 6:
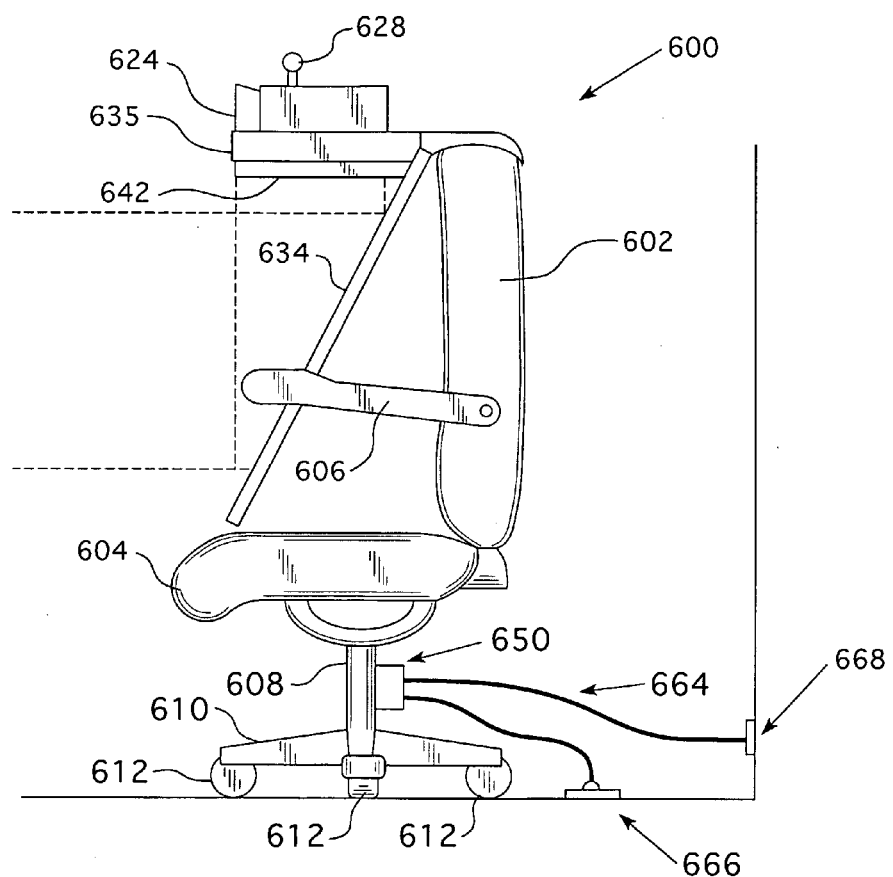
FIG. 6 is a side view of a virtual presence chair in accordance with one non-limiting embodiment.

FIG. 6 is a side view of a virtual presence chair 600 in accordance with one non-limiting embodiment. In this illustrated embodiment, the video screen 642 is mounted above the projection screen 634 on a shelf 635. The video screen 642 helps to shield the projection screen 643 from ambient lighting, which may help to increase visibility. While the video camera 624 is shown being mounted on the shelf 635, this disclosure is not so limited. For example, in some embodiments, the video camera 624 may be integrated into the seatback 602 or mounted in any other suitable location.

Figure 7:
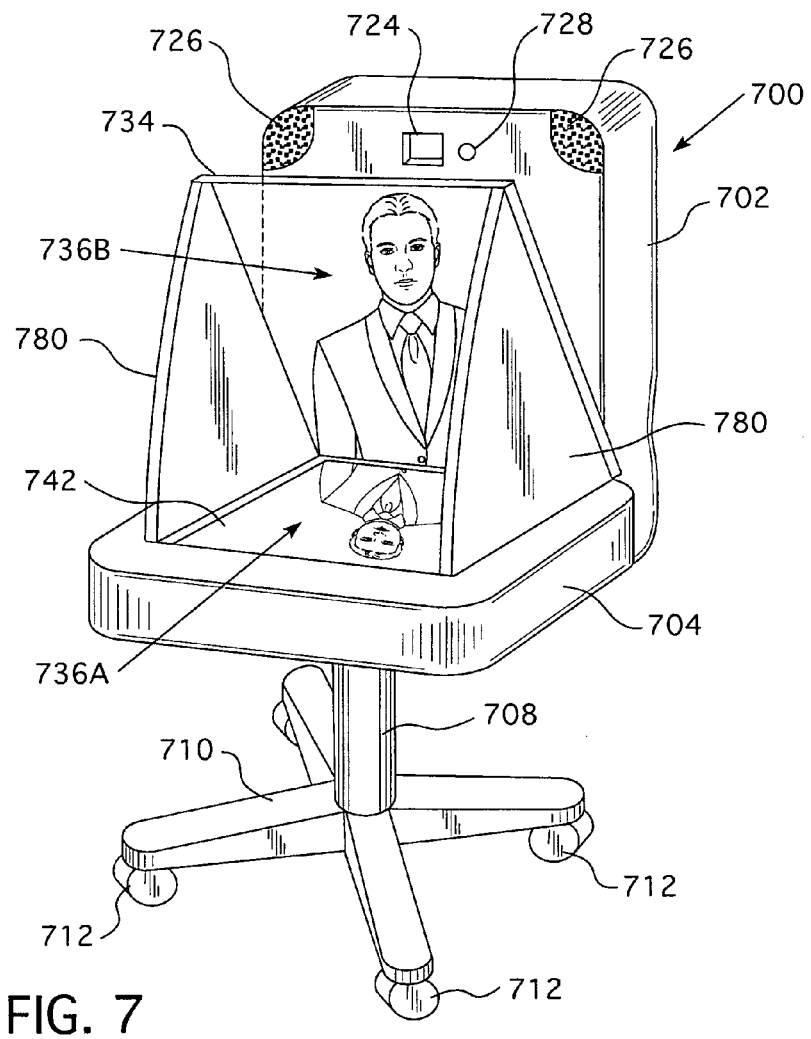
FIG. 7 is a perspective view of a virtual presence chair in accordance with one non-limiting embodiment.

FIG. 7 is a perspective view of a virtual presence chair 700 in accordance with one non-limiting embodiment. In this illustrated embodiment, the video screen 742 is integrated into the seat 704. The projection screen 734 is mounted at an angle relative to a vertical plane in order to reflect a video image 736A from the video screen 742. The virtual presence chair 700 may comprise light shields 780 positioned on either side of the projection screen 734. In some embodiments, the light shields 780 are removable and/or adjustable. The light shields 780 may block out some of the ambient lighting in order to increase the visibility of the reflected image 736B on the projection screen 734.

Figure 8:
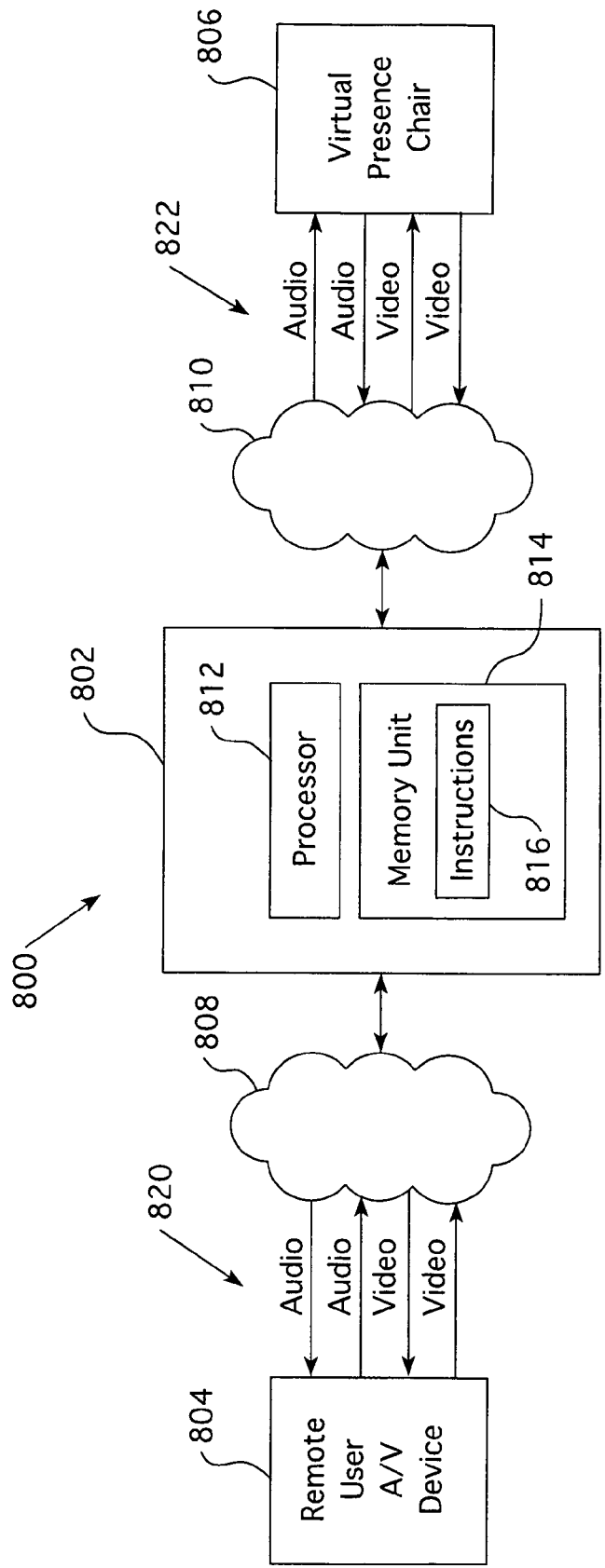
FIG. 8 shows a virtual presence conferencing system in accordance with one non-limiting embodiment.

FIG. 8 shows a virtual presence conferencing system 800 in accordance with one non-limiting embodiment. The virtual presence conferencing system 800 may be provided using any suitable processor-based device or system, such as a personal computer, laptop, server, mainframe, or a collection (e.g., network) of such computer devices, for example. The virtual presence conferencing system 800 may comprise a video conferencing computer device 802. The video conferencing computer device 802 may be in communication with a remote user A/V device 804 and a virtual presence chair 806. The video conferencing computer device 802 may be in communication with the remote user A/V device 804 via an electronic communications network 808. The video conferencing computer device 802 may be in communication with the virtual presence chair 806 via an electronic communications network 810. The communications networks 808, 810 may include a number of voice, computer and/or data networks, including the Internet, Local Area Networks (LANs), Wide Area Networks (WANs), General Packet Radio Services (GPRS) networks, etc., and may comprise wired and/or wireless communication links. The remote user A/V device 804 may communicate; with the video conferencing computer device 802 and may be any type of client device suitable for communication over the network, such as any combination of landline telephone, a mobile telephone, a Voice Over Internet Protocol (VoIP) telephone, a personal computer, a laptop computer, a videoconferencing unit (e.g., microphone, video camera, video screen), a netbook computer, a video camera, and a web-enabled camera, for example. While a single remote user A/V device 804 and a single virtual presence chair 806 are illustrated, it is to be appreciated that the video conferencing computer device 802 may support simultaneous communication with a plurality of remote user A/V devices 806 and/or a plurality of virtual presence chairs 806.

Still referring to FIG. 8, the video conferencing computer device 802 may comprise one or more processors 812 and one or more computer memory units 814. For convenience, only one processor 812 and only one memory unit 814 are shown in FIG. 8. The processor 812 may execute software instructions 816 stored in the memory unit 814. The processor 812 may be implemented as an integrated circuit (IC) having one or multiple cores. The memory unit 814 may include volatile and/or non-volatile memory units. Volatile memory units may include random access memory (RAM), for example. Non-volatile memory units may include read only memory (ROM), for example, as well as mechanical non-volatile memory systems, such as, for example, a hard disk drive, an optical disk drive, etc. The RAM and/or ROM memory units may be implemented as discrete memory ICs, for example.

When the processor 812 of the video conferencing computer device 802 executes the instructions 816, the processor 812 may be caused to perform the various operations of the virtual presence conferencing system 800, such as send/receive audio and video 820 from a remote user and send/receive audio and video 822 from the virtual presence chair 806.

Although FIG. 8 depicts a limited number of elements for purposes of illustration, it can be appreciated that the virtual presence conferencing system 800 may include more or less elements as well as other types of elements in accordance with the described example embodiments. Elements of the virtual presence conferencing system 800 may include physical or logical entities for communicating information implemented as hardware components (e.g., computing devices, processors, logic devices), executable computer program instructions (e.g., firmware, software) to be executed by various hardware components, or combination thereof, as desired for a given set of design parameters or performance constraints.

In general, it will be apparent to one of ordinary skill in the art that at least some of the embodiments described herein may be implemented in many different embodiments of software, firmware, and/or hardware. The software and firmware code may be executed by a processor or any other similar computing device. The software code or specialized control hardware that may be used to implement embodiments is not limiting. For example, embodiments described herein may be implemented in computer software using any suitable computer software language type, using, for example, conventional or object-oriented techniques. Such software may be stored on any type of suitable computer-readable medium or media, such as, for example, a magnetic or optical storage medium. The operation and behavior of the embodiments may be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes associated with the present embodiments may be executed by programmable equipment, such as computers or computer systems and/or processors. Software that may cause programmable equipment to execute processes may be stored in any storage device, such as, for example, a computer system (nonvolatile) memory, an optical disk, magnetic tape, or magnetic disk. Furthermore, at least some of the processes may be programmed when the computer system is manufactured or stored on various types of computer-readable media.

It can also be appreciated that certain process aspects described herein may be performed using instructions stored on a computer-readable medium or media that direct a computer system to perform the process steps. A computer-readable medium may include, for example, memory devices such as diskettes, compact discs (CDs), digital versatile discs (DVDs), optical disk drives, or hard disk drives. A computer-readable medium may also include memory storage that is physical, virtual, permanent, temporary, semipermanent, and/or semitemporary.

A "computer," "computer system," "host," "server," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software modules used in obtaining, processing, and communicating information. It can be appreciated that such memory may be internal or external with respect to operation of the disclosed embodiments. The memory may also include any means for storing software, including a hard disk, an optical disk, floppy disk, ROM (read-only memory), RAM (random access memory), PROM (programmable ROM), EEPROM (electrically erasable PROM) and/or other computer-readable media.

In various embodiments disclosed herein, a single component may be replaced by multiple components and multiple components may be replaced by a single component to perform a given function or functions. Except where such substitution would not be operative, such substitution is within the intended scope of the embodiments. Any servers described herein, for example, may be replaced by a "server farm" or other grouping of networked servers (such as server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand and/or providing backup contingency in the event of component failure or reduction in operability.

The computer systems may comprise one or more processors in communication with memory (e.g., RAM or ROM) via one or more data buses. The data buses may carry electrical signals between the processor(s) and the memory. The processor and the memory may comprise electrical circuits that conduct electrical current. Charge states of various components of the circuits, such as solid state transistors of the processor(s) and/or memory circuit(s), may change during operation of the circuits.

Reference throughout the specification to "various embodiments," "some embodiments," "one embodiment," "some example embodiments," "one example embodiment," or "an embodiment" means that a particular feature, structure, or characteristic described in connection with the embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics may be combined in any suitable manner in one or more embodiments.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A virtual presence communication system to enable a local participant to communicate with a remote participant, the virtual presence communication system comprising:
   a projection screen configured to couple to a chair, wherein the projection screen is positionable for viewing by a local participant;
   an image-generating unit configured to couple to the chair, the image-generating unit configured to display an image of the remote participant, wherein the image-generating unit is positionable in an angled relationship to the projection screen;
   at least one communication port configured to couple to the chair, wherein the communication port is configured to receive a video signal for display by the image-generating unit; and
   a video camera configured to couple to the chair.

2. The virtual presence communication system of claim 1, further comprising:
   a microphone; and
   an audio speaker, each configured to couple to the chair.

3. The virtual presence communication system of claim 1, wherein the image-generating unit comprises an LCD display.

4. The virtual presence communication system of claim 1, wherein the image-generating unit comprises a video projector.

5. The virtual presence communication system of claim 3, wherein the LCD display is configured to be mounted substantially parallel to a top surface of a seat portion of the chair.

6. The virtual presence communication system of claim 1, further comprising a chair, wherein the chair further comprises a seatback and a seat.

7. The virtual presence communication system of claim 6, wherein the chair comprises a first armrest and a second armrest, and wherein the projection screen is positioned intermediate the first armrest and the second armrest.

8. The virtual presence communication system of claim 6, wherein the image-generating unit is at least partially positioned beneath a top surface of the seat.

9. The virtual presence communication system of claim 1, wherein the angular relationship of the projection screen and the image-generating unit is adjustable.

10. The virtual presence communication system of claim 9, wherein the angular position of the projection screen is adjustable.

11. The virtual presence communication system of claim 9, wherein the angular position of the image-generating unit is adjustable.

12. The virtual presence communication system of claim 2, wherein at least one of the video camera and the audio speaker are configured to couple to a seatback portion of the chair.

13. The virtual presence communication system of claim 1, wherein the projection screen is configured to couple to a seatback portion of the chair and the image-generating device is configured to couple to a seat portion of the chair.

14. A method for virtual presence conferencing, comprising:
   receiving a video image of a remote participant in a conference;
   displaying the video image on a video monitor coupled to a chair;
   reflecting the video image by a projection screen towards a local participant, wherein the projection screen is coupled to the chair; and
   capturing a video image of the local participant using a video camera coupled to the chair.

15. The method of virtual presence conferencing of claim 14, further comprising:
   receiving audio from the remote participant in the conference;
   projecting the audio using an audio speaker coupled to the chair; and
   capturing audio of the local participant using a microphone coupled to the chair.

16. The method of virtual presence conferencing of claim 14, wherein the chair is positioned at a conference table in a conference room.

17. The method of virtual presence conferencing of claim 14, wherein the video image is displayed on an LCD monitor.

18. The method of virtual presence conferencing of claim 14, wherein the video image is displayed using a video projector.

19. The system of claim 1, wherein the system does not include a mirror.

20. The method of claim 14, wherein the method does not comprise reflecting an image off of a mirror.

* * * * *